Oct. 18, 1966  A. S. GONZALEZ  3,279,400
DEVICE FOR SUGAR CANE CUTTING AND PLANTING
Filed June 10, 1964  4 Sheets-Sheet 1

INVENTOR
AVELINO S. GONZALEZ

BY
Stevens, Davis, Miller & Mosher
ATTORNEYS

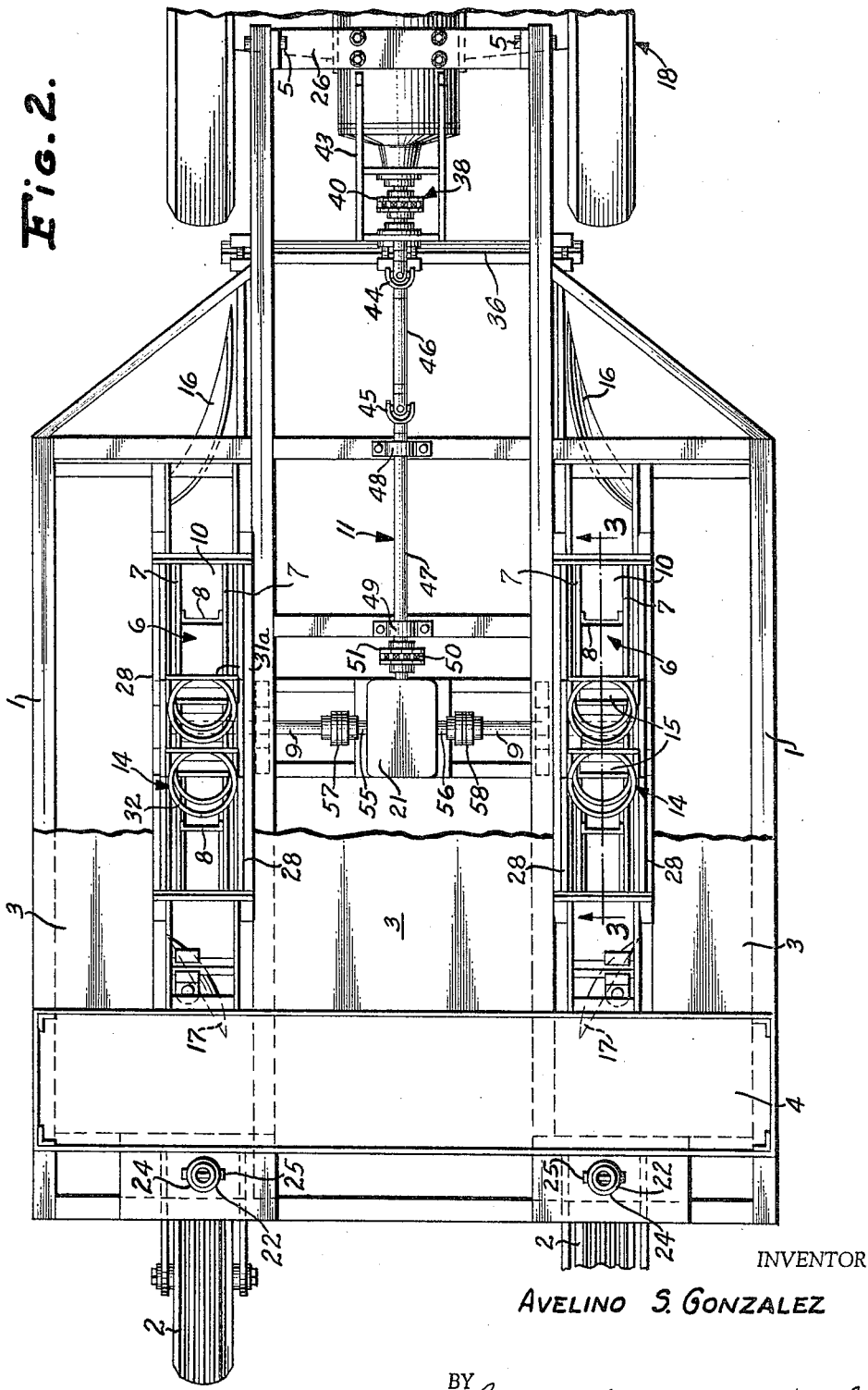

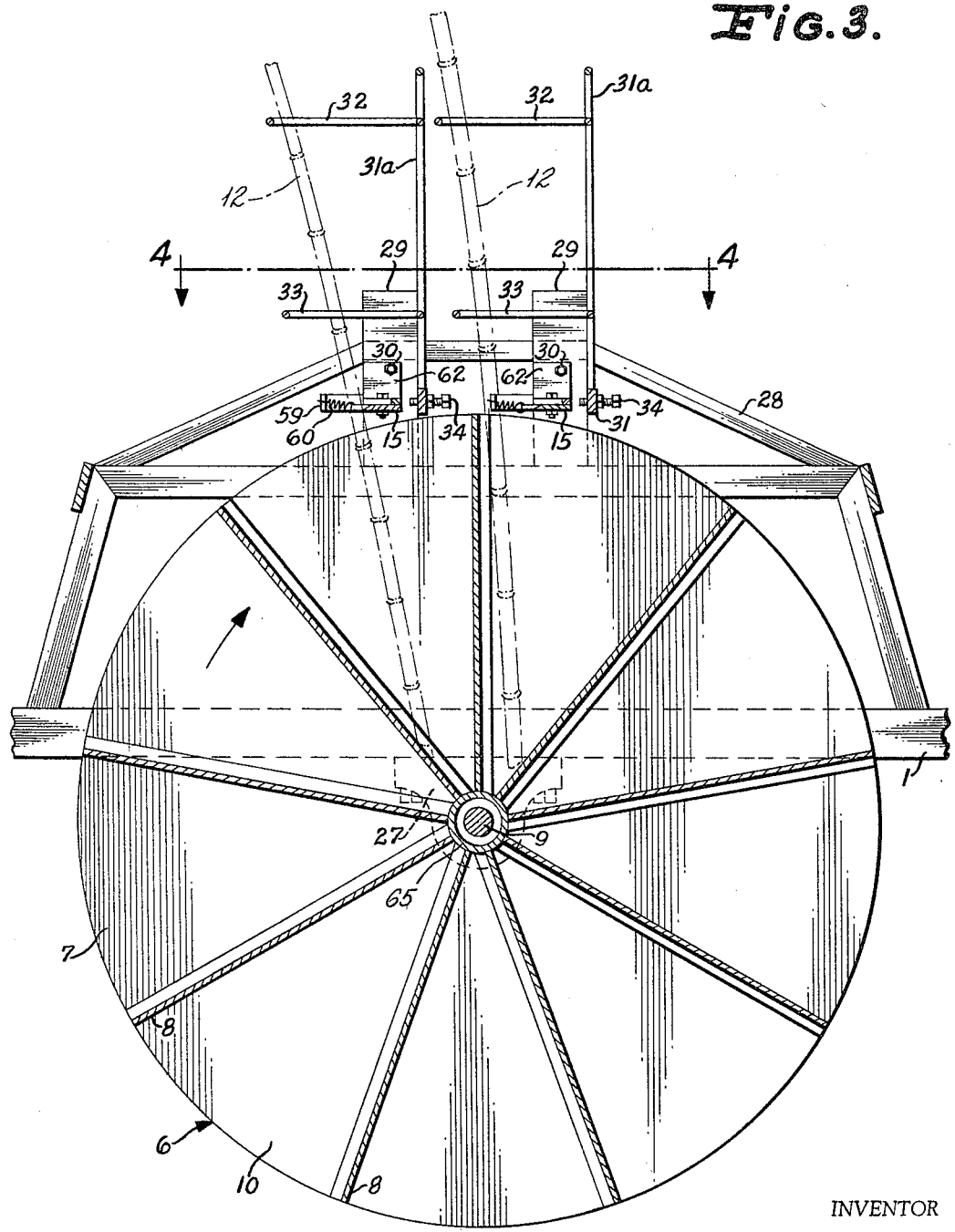

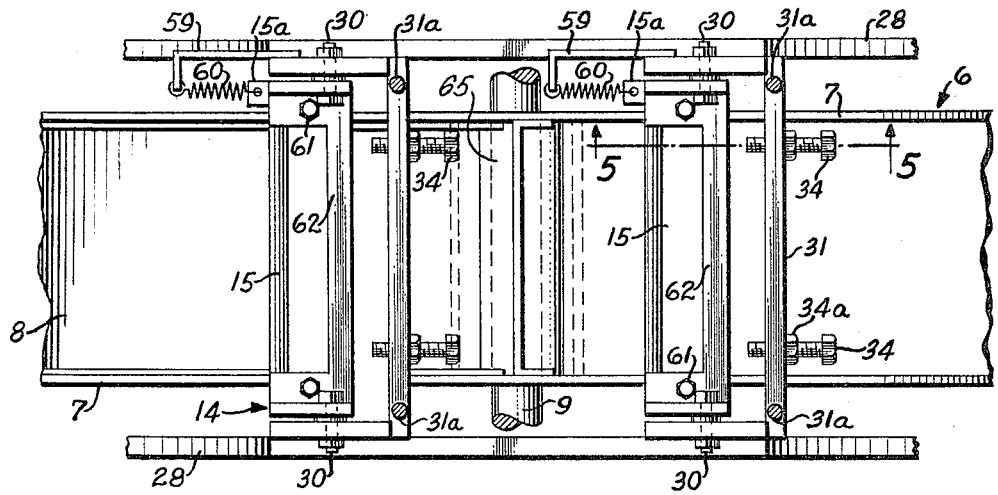
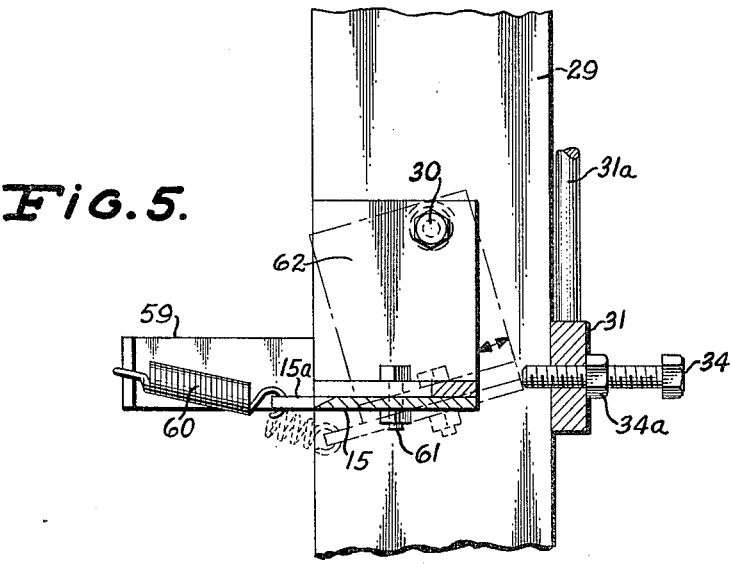

United States Patent Office 3,279,400
Patented Oct. 18, 1966

3,279,400
DEVICE FOR SUGAR CANE CUTTING
AND PLANTING
Avelino S. Gonzalez, Miami, Fla. (Carretera Duarte Km. 11, Villa Octavia, Santo Domingo, Dominican Republic)
Filed June 10, 1964, Ser. No. 374,200
13 Claims. (Cl. 111—3)

This invention relates to a device adapted to cut sugar cane stalks and plant cut sugar cane seed segments in a continuous operation.

The conventional way of preparing sugar cane for seed planting and the planting thereof, includes the following basic steps. After cutting the plant in the fields, the cane stalks are subsequently cut into segments of adequate size for planting. These segments are later formed into piles of any desired size in order to, in a further operation, pack the cut seed segments in sacks. This sack-packing step is intended to facilitate the loading of the seeds on the means utilized for hauling and transporting the seed to the field where the planters are operating. Once in the field, the seed sacks are distributed in piles on the ground within the expected operative reach of the planting apparatus.

One primitive and obvious operation has always been to cut the cane stalks into seed segments by hand, using machetes, or other similar cutting instruments. Another operational form shown by the art discloses the utilization of apparatus or machinery intended for the purpose of cutting the cane stalks into seed segment size.

Additionally, the art also discloses machinery or apparatus intended to perform the operation of cutting the cane stalks and planting the cane seed segments in situ. These apparatus, according to the teachings of the art, in general, comprise complex, heavy, and expensive equipment that economically burden the cost of the cane seed planting operation.

It is a principal object of my invention to overcome the above-mentioned inconveniences by providing an uncomplicated and inexpensive device capable of performing in an uninterrupted operation the cutting of long sugar cane stalks into seed sized segments, planting the segments into a furrow, and further, closing the furrow by furrow-closing means installed on the planting device.

Another object of my invention is to provide a sugar cane cutting and planting device, capable of cutting to convenient size sugar cane stalks into seed segments to circumvent the need of having the cane stalks being previously cut into seed segments by other means.

It is a further object of my invention to provide a device for the cutting and planting of sugar cane seed segments simultaneously in a plurality of parallel furrows.

It is still a further object of my invention to make possible a reduction of the high operational costs involved in sugar cane seed cutting and planting by diminishing the number of separate operations needed for the cutting and planting of the cane seed, as well as by reducing the cost of the operating equipment.

To effect these and related objects which shall become apparent as the description proceeds, my invention resides in the combination, construction, and arrangement of parts as shall be hereinafter more fully described, illustrated in the accompanying drawings, and pointed out in the claims hereunto appended.

With reference to the accompanying drawings, which form a part thereof, a preferred embodiment of the invention is illustrated.

FIGURE 2 is a top plan view of the apparatus of FIGURE 1.

FIGURE 3 is a fragmentary side elevational view along line 3—3 of FIGURE 2 of the cane cutting and planting apparatus.

FIGURE 4 is a fragmentary top plan view along line 4—4 of FIGURE 3 showing component parts of the cutting device.

FIGURE 5 is a vertical sectional view along the line 5—5 of FIGURE 4 showing in part the oscillating movement of the cane stalk cutting knife.

Figure 1:
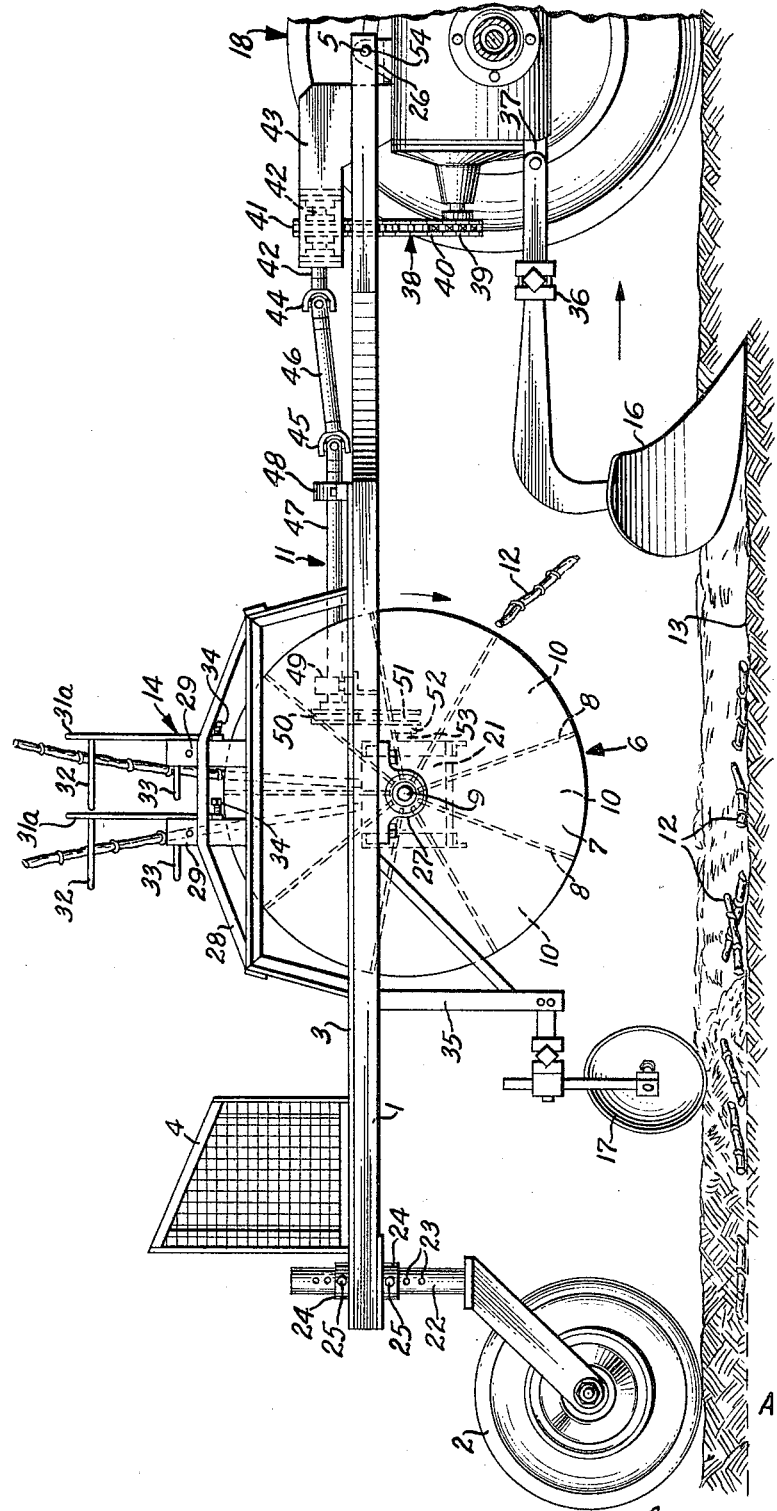
FIGURE 1 is a side elevation of a preferred embodiment of the invention illustrating a sugar cane stalk cutting and planting device assembled to a power and towing means.

In a preferred embodiment of the invention the cane stalk cutting and planting apparatus shown in FIGURES 1 and 2 is connected to a towing vehicle 18 which, additionally, supplies energy to operate the cutter and planter. Reference numeral 1 shows a supporting frame having larger longitudinal than transverse dimensions.

Reference numeral 6 designates a number of rotatable, radially sectioned planting drums substantially intermediate of the front and rear portions of the frame 1 and oriented in longitudinal registry alignment with said frame. The number of planting drums may vary, according to planting requirements, from one to as many as practically adequate. Each drum 6 comprises two transversely spaced circular end plates 7 having central openings and interconnected by a central sleeve 65 having its openings aligned with the plate openings. Extending between the plates 7 and radially from the center sleeve 65 are a plurality of panels 8 dividing the drum into a plurality of taper-shaped top opened pockets 10 for receiving cut lengths of sugar cane. Each panel 8 is fixedly secured lengthwise by its sides to both circular spaced plates 7.

Each of said drums 6 is supported by an axle 9 extending into a pair of journaled bearings 27 provided with cap and studs and disengageably secured to the frame 1. The diameter of the drum 6 being such that the outer periphery is always spaced above the ground.

Energy transmission means 11 are operatively connected to speed reduction means 21 operatively connected to axle 9 of the drums to rotate the drums at a given speed. By adjusting a conventional speed regulating mechanism of the power transmission arrangement 38 connected to the power take-off means of the towing vehicle 18, the drums will be caused to rotate at varied speeds according to planting requirements and accordingly diminish or increase the number of cane plantings being planted along a given furrow.

Regarding the taper-shaped pockets 10 defined within each of the planting drums 6. The number of pockets 10 may vary and is related to the diameter dimension of the drum. Experience indicates that better performance is obtained when a number of pockets between 12 and 36 is used. However, the number of pockets in each drum may be reduced to one.

The tapering of each pocket 10 increases from the periphery of the circular plate 7 towards the axle portion 9 of a drum. Each top opened pocket 10 being so shaped that a cane stalk segment 12 after being cut will remain within the pocket standing substantially upright in order that the inclination of the drum will cause the said segment, when inclined towards the ground, to slide from the pocket and alignedly fall within a furrow opened in longitudinal alignment with the drum.

The foregoing is accomplished, when making the drum, by controlling the transverse spacing between plates 7. This is, given a desired size of segment to be planted the dimension of the transverse separation between the plates 7, must be substantially less than the length of a cut cane segment.

The length of a cut cane segment is substantially equal to the distance from the bottom of a pocket 10 to a cutting knife 15 position above the pocket and substantially adjacent the open end of a panel 8 within the drum 6.

Reference numeral 14 designates a cutting device aligned over the pockets of each sectioned drum 6. Each cutting device comprises a pair of chassis structures 28 in symmetry, each respectively adjacent, but out of contact with circular plates 7 of the sectioned drum. The chassis being secured to the frame by conventional means, preferably by welding. The center or midportion of chassis 28 being in substantial vertical alignment with axle 9 of the mentioned sectioned drum. Numeral 29 illustrates a pair of parallel upright knife supporting plates which are fixedly secured to chassis structures 28.

A plate 31 in axial alignment with drum 6 is fixed to each pair of knife supporting plates 29, spanning the space between each pair and at right angles to them. A pair of screws 34 are threaded through plate 31 adjacent opposite ends thereof and are provided with lock nuts 34a. The said screws 34 adjustably limit the backward pivoting movement of knife 15, when pushed by a cane stalk 12, due to the forward force exterted on the cane by the rotation, of a panel 8 towards the knife 15.

A pair of conveniently spaced rings 32 and 33 are located above and in vertical alignment with each knife and are fixedly secured, one above the other, to vertical rods 31a, fixed to plate 31. Rings 32 and 33 perform the function of maintaining the cane stalks in upright position to aid the cutting operation.

Although the apparatus may efficiently operate with a single cutting apparatus 14 its performance and productivity may be directly increased by using a pair of such cutting apparatus providing two separate cutting blade arrangements per drum 6 being used, and consequently, thus incrementing the number of seed segments per planting unity being planted.

Reference numeral 17 illustrates a disc disengageably and adjustably positioned on an arm 35 extending vertically downward from the frame and spaced from sectioned drum 6. Disc 17 is intended to operate as a furrow closing means. It will be readily understood that the number of discs 17 in the cutting and planting apparatus depends on the number of planting drums utilized in the planting operation, generally one to each planting drum. It may also be advisable in certain cases, to use two furrow closing discs arranged in V formation, having the vertex of the V oriented facing the supporting drums.

In FIGURE 1, frame 1 also shows in its rear portion a plurality of wheels indicated by reference numeral 2. These wheels are secured under the frame to a rotatable axle 22 journaled to the frame and extending through collars 24 which are secured to the frame. The axle includes a series of perforations 23 extending along its length to allow vertical adjustment thereof by means of a pin 25 to maintain the frame substantially in parallel orientation with the ground. The said wheels 2 are positioned at the rear of the frame spaced from each other, adjacent opposite corners therof. The number of wheels 2 is preferably the same as the number of furrows intended to be planted by the apparatus. When more than two rear wheels are utilized the wheels are spacedly distributed along said rear portion of the frame so that each wheel corresponds to a furrow being planted. The above mentioned wheels will additionally act as ramming means to press the ground deposited when closing the furrow over the planted seeds.

On the said rear portion of the frame a standing platform 3 is provided for the operator or operators. The number of operators needed to operate the cutting and planting apparatus is proportionate to the number of stalks to be cut in an operation and to the number of furrows to be planted. Reference numeral 4 illustrates a cage-like structure or a similar known form of deposit for sugar cane stalks adjacent and within reach of the operators.

The end of each front side portion of the frame features a bore indicated by reference numeral 26. The said bore 26 engages a pin 5 at each side of an upper pull-bar 54 secured to the rear of the a vehicle 18 thus pivotally joining the planting apparatus to the moving vehicle for towing the planting apparatus along the open furrows when performing the planting operation.

Reference numeral 18 illustrates the rear portion of a vehicle, preferably a tractor or any suitable agricultural machinery. Vehicle 18 serves the dual purpose of acting as a towing means to displace the planting apparatus over the planting field and to provide a source of energy for operatively rotating sectioned drum 6. The vehicle 18 is connected to the planting apparatus by engaging front side end portions of the frame 1 in pivot pins 5 provided at each end of the upper pull bar 54 of the vehicle. A plow 16, or other furrow opening means, is illustrated by numeral 16 pivotally attached by means of a disengageable arm 36 to the lower tractor pull-bar 37.

Reference numeral 38 illustrates a power transmission arrangement intended to operatively transmit energy obtained from a power take-off source on vehicle 18 to a reduction gear mechanism 21 which in its turn is operatively connected to axle 9 in order to rotate the drums 6 at a desired number of revolutions. The said power transmission arrangement 38 includes a sprocket pinion wheel 39 operatively connected by means of a link chain 40 to a second sprocket pinion wheel 41, separately spaced and above sprocket 39 which rotates on axle 42. One of the ends of axle 42 is rotatably connected through support 43, to the vehicle 18 and its other end 42, coupled by universal joints 44 and 45 to a link 46 and a shaft 47. Shaft 47 is journaledly supported by bearings 48 and 49 and terminates in a sprocket pinion 50 operatively connected by means of link chain 51 to a second sprocket wheel 52 which, in its turn by means of axis 53, operates the speed reduction gear mechanism 21.

In FIGURE 2 numeral 21 designates a speed reduction mechanism positioned between planting drums 6. Short axles 55 and 56 protrude through respective left and right hand sides of the speed reduction mechanism 21. Each one of axles 55 and 56 are operatively connected to axle 9 of the sectioned drum by means of couplings 57 and 58.

The speed reduction mechanism preferably comprises a worm gear reducer, although any other known means or mechanical device, capable of performing similar function, may be utilized.

The said speed reduction mechanism 21 is intended to diminish or increase, within required limits, the number of revolutions of the planting drums. This is preferably attained by adjusting the speed regulating means in the vehicle's power take-off means, rather than by increasing the speed of displacement of the apparatus.

In fact, given a fixed rate of rotation of the planting drum, if the number of plantings per furrow is desired to be increased the displacement speed of the device will have to be inversely diminished; the lower the speed of displacement the more plants per furrow. This adversely reflects timewise on the overall planting performance of the device.

Conversely, given an adequate fixed speed rate of displacement of the device, if the number of plantings per furrow is desired to be increased, this will be attained by increasing the number of revolutions of the planting drum, maintaining constant the speed rate of displacement of the device, henceforth obtaining a larger amount of plantings per minute of operation of the planter.

FIGURE 3 shows a detailed fragmentary view of the cutting and planting apparatus. Numeral 62 illustrates a metallic bed plate transversely extending over the upper portion of sectioned drums 6. Said bed plate 62 horizontally spans between upright plates 29 and spacedly contacts said plates 29 by means of its end portions. The said end portions may be bent either upwards or downwardly, but will always define substantially right angles with the center portion of plate 62. Each end portion of plate 62 is pivotally secured to plates 29 by means of a nut and bolt arrangement 30. A cutting knife 15 is fixedly secured in registry to plate 62 by means of nut and bolt arrangements 61.

An ear 15a is formed on one end of blade 15 and protrudes beyond plate 62. One end of a spring 60 is inserted in a hole in ear 15a and the other end of spring 60 engages in a hole provided on the short arm of an L-shaped bracket 59 fixedly secured to one of plates 29, providing spring means to restore bed plate 62 and blade 15 to a pre-cutting position by pivoting on arrangement 30.

FIGURE 4 shows a top view of the cutting apparatus 14 in its relative position over sectioned drum 6. Plates 62 are provided with a recessed margin defining an elongated rectangle in the region of the sharpened portion of knife 15.

FIGURE 5 illustrates the pivoting or oscillating motion of the plate and blade arrangement 62 and 15 and further illustrates the action of screws 34 in limiting the swinging angular backwards displacement of arrangement 62 and 15. FIGURE 5 further illustrates, by reference numerals 59 and 60, the action of spring 60 on the plate and blade arrangement 62 and 15 pivoting on bolt and nut arrangement 30, to restore the said arrangement to its normal position after a cutting operation.

For the purpose of operatively utilizing the sugar cane cutting and seed planting device; once a convenient amount of sugar cane is placed in deposit 4, when the sectioned drum 6 is rotating at a desired speed, and the towing vehicle 18 starts displacing the planting device over the field. Each operator or operators for the cane cutting and planting device will insert, vertically oriented, a sugar cane stalk 12 through guiding rings 32 and 33 until the stalk contacts the bottom of a pocket 10 on the sectioned planting drum 6 and is positioned in front of a cutting knife 15. The rotational movement of the wheel will cause a panel 8 to forcefully contact and push the rigid sugar cane stalk against knife 15 secured to swinging bed-plate 62. This contact will cause knife-holding plate 62 to swing angularly backwards until stopped by the action of regulating screws 34, providing an adequate cane cutting angle. On continuance of the force exerted by panel 8 on the sugar cane stalk against the knife a cane segment 12 will be severed. The remaining portion of the cane stalk will fall in the immediately subsequent pocket, ready for another cut, and so on until the whole stalk has been cut, and a new cane stalk is positioned in the device to continue the cutting and planting operation. Meanwhile the apparatus is being towed forward by the towing means 18 causing the plow 16 to open a furrow, whereunto the cut sugar cane will slide once the rotating movement of the drum has placed the pocket containing said segment in such an inclination that the segment will, by gravity, fall into the open furrow. The continued displacement of the apparatus will cause the furrow closing disc 17 to cover the planted segments with earth removed and laterally displaced by the prior action of the plow. And finally a supporting wheel 2 positioned in vertical longitudinal alignment with the disc, the planting drums, and the furrow, will ram the moved earth pressing the ground deposited in the furrow, and over the planted sugar cane seed segments.

The structures herein disclosed constitute a preferred embodiment of the invention. It should be understood that other structures might be adopted which do not depart from the teachings herein incorporated. Such are deemed to come within the purview of the invention.

What I claim is:

1. A sugar cane stalk cutting and planting device comprising a frame, a cane stalk pocket receiving means rotatably mounted on the frame, said pocket having side walls and a top opening, a cutting means aligned with the pocket opening when the pocket means is in substantially vertical position, guiding means above the cutting means for positioning the cane stalk in front of the knife and into the pocket, and means for rotating the pocket towards the knife whereby the advancing wall of the pocket will force the knife to cut the cane.

2. A sugar cane stalk cutting and planting device comprising a frame, frame supporting means and furrow closing means under the frame, a plurality of stalk pocket receiving means within a rotatable planting drum, a plurality of cutting means over the said planting drums, a plurality of guiding means comprising a pair of rings vertically aligned above the cutting means, towing means connected to the frame, furrow opening means connected to the towing means, and power source and power transmission means operatively connecting the power source means to a speed reduction means.

3. A sugar cane cutting and cane seed planting device comprising a longitudinally elongated frame, a number of frame supporting wheels pivotally mounted rearwardly of the frame and adjacent transverse rear corners thereof, a number of furrow closing means in longitudinal alignment with and secured under the frame, a number of rotatable, radially sectioned planting drums in longitudinal alignment with and secured by their axles to the frame, the said radial sections defining a number of top opened pockets, a number of cutting means positioned above the sectioned drums and transversely extending in substantially parallel orientation over each sectioned drum, speed reduction means in the frame adjacent the planting drums operatively connecting each sectioned drum, towing and power source means independent of and pivotally connected to the frame, a number of furrow opening means pivotally connected to the said power source, and power transmission means operatively connecting the said power source means with speed reduction means on the frame.

4. The device claimed in claim 3 wherein each of said pockets comprises a pair of equiaxial substantially circular plates in symmetry, the said plates being spaced from each other by a plurality of radially positioned substantially parallelogram-shaped panels fixedly secured lengthwise by their sides to both circular plates, the said panels extending from a substantially axial portion of the drum towards a point adjacent the periphery of the said circular plates, the said radial panels defining a number of said pockets having their top openings tapered towards, and with their vertices adjacent, the axis of the drum, the said drum having inward and outward projecting portions of the axle journaled on a pair of bearings disengageably secured to the frame, the said inwardly projecting portion of each axle being operatively coupled for rotation to a laterally projecting axle of a speed reduction means.

5. The device claimed in claim 3 wherein the frame is of larger transverse than longitudinal dimensions and defines a transverse right-angle parallelogram.

6. The device claimed in claim 3 wherein the frame is of equal transverse and longitudinal dimension and defines a square right angle parallelogram.

7. The device as claimed in claim 3 wherein the cutting means comprise a pair of chassis structures fixedly secured to the frame, each said chassis structure positioned respectively adjacent, but out of contact, with the circular plates of each planting drum, the said chassis structure having its midportion in substantial vertical alignment with the axis of each planting drum, a pair of elongated upright supporting plates having a bore defined adjacent their upper portion, each said plate being fixedly secured to each chassis structure and extending upwardly thereof, a transverse upright plate in right angle contact engagement with the said elongated supporting plates and fixedly secured thereto, a pair of guiding rings vertically aligned, one above the other, and fixedly secured by vertical rods to the said transverse plate, an elongated knife supporting bed-plate provided with a recessed margin defining an elongated rectangle, the said bed-plate having respective end portions bent at right angles therewith, the said bed-plate transversely extending over and in substantially parallel orientation with the axle of a planting drum, the said bed-plates being swingingly operable by means inserted on holes defined adjacent the end of their respective end portions and in registry with bores defined in the upper portions of the said elongated upright plates, an elongated cutting knife in parallel registry with and disengageably secured to the said bed plate, the said knife including at one end a bored ear portion protruding outwardly from the said bed plate, an L-shaped bracket fixedly secured at one end and extending outwardly from one of the said upright supporting plates, the other end of the said L-shaped bracket having a hole defined adjacent its end portion, facing the said bored ear portion of the knife, a coil spring having one of its ends inserted in the bored portion of the L-shaped bracket and its other end inserted on the said hole defined in the ear portion of the knife, and a plurality of screws threaded through the said upright plate to operatively regulate by limiting the backward swinging movement of the blade and the bed-plate, caused by the striking force of a cane stalk being pushed against the knife by a panel of the sectioned planting drum.

8. The device claimed in claim 7 wherein a plurality of cutting means, including blades, plates, and spring arrangements, are positioned in each chassis structure.

9. The device claimed in claim 3 wherein the furrow opening means is a number of plows disengageably and swingingly connected to towing and power source means, and positioned substantially intermediate between the said power source means and the planting drum in longitudinal alignment therewith.

10. The device claimed in claim 3 wherein the furrow closing means secured under the frame is a number of discs obliquely oriented over an open furrow and positioned substantially and in longitudinal alignment between the axis of the rotating planting drum and the frame supporting wheels.

11. The device claimed in claim 10 wherein the furrow closing discs are arranged forming a V, the vertex of said V facing a rear frame supporting wheel.

12. The device claimed in claim 3 wherein the power source means is provided with adjustable speed regulating means to increase the rate of revolutions of the power transmission means, and effectively cause the speed reduction means to actuate the planting drums at an increased rate of cane segment plantings per furrow.

13. The device claimed in claim 3 wherein the power source means is provided with adjustable speed regulating means to decrease the rate of revolutions of power transmission means and effectively cause the speed reduction means to actuate the planting drums at a decreased rate of cane seed plantings per furrow.

References Cited by the Examiner

UNITED STATES PATENTS

| | | | |
|---|---|---|---|
| 1,618,958 | 2/1927 | Kassebeer | 111—3 |
| 1,764,159 | 6/1930 | Estevez | 111—3 |
| 2,841,103 | 7/1958 | Arceneaux | 111—3 |
| 3,073,265 | 1/1963 | Movilla et al. | 111—3 |

ABRAHAM G. STONE, *Primary Examiner.*

R. E. BAGWILL, *Assistant Examiner.*